INVENTOR:
VANDERVEER VOORHEES

INVENTOR:
VANDERVEER VOORHEES

United States Patent Office 3,067,018
Patented Dec. 4, 1962

3,067,018
COLLOIDAL ADDITIVES FOR FUEL OILS
Vanderveer Voorhees, Los Altos, Calif., assignor to Bray Oil Company, Los Angeles, Calif., a limited partnership of California
Filed Oct. 29, 1957, Ser. No. 693,161
10 Claims. (Cl. 44—51)

This invention relates to colloidal dispersions of solids in oils, particularly suitable for adding to fuel oils, such as heavy residual fuel oils burned in steam boilers, diesel fuel oils, distillate furnace oils, fuels for gas turbines, gasoline, and the like. The invention relates more particularly to colloidal dispersions of metal oxides and hydroxides which can be readily mixed in small amounts with various fuel oils and which, on combustion, become deposited on the surfaces of combustion chambers to protect them from corrosion of metal and slagging of refractories such as occurs in the case of residual fuel oils containing vanadium compounds, and other acidic bodies.

One object of the invention is to provide a colloidal dispersion of metal oxides, hydroxides, and carbonates and a method of making it, in which the particles of metal compound are sufficiently small and sufficiently well stabilized or peptized to remain in oil solution almost indefinitely without settling out. Another object of the invention is to provide colloidal dispersions of metal oxides and hydroxides by a new method of manufacture which will produce stable dispersions at a cost sufficiently low to permit their use in the cheap fuel oils used in steam boilers. Still another object of the invention is to provide an additive for fuels containing vanadium which will effectively suppress corrosion of internal combustion engine parts, boiler tubes and turbine blades by the action of vanadic acid without excessively increasing the ash content of the oil. A still further object of this invention is to provide a colloidal basic solid suspended in a liquid fuel for internal combustion engines which will scavenge the engine of acidic substances such as vanadic acid, nitric, sulfuric, phosphoric and plumbous acids, usually present in the form of their anhydrides.

Figure 1:
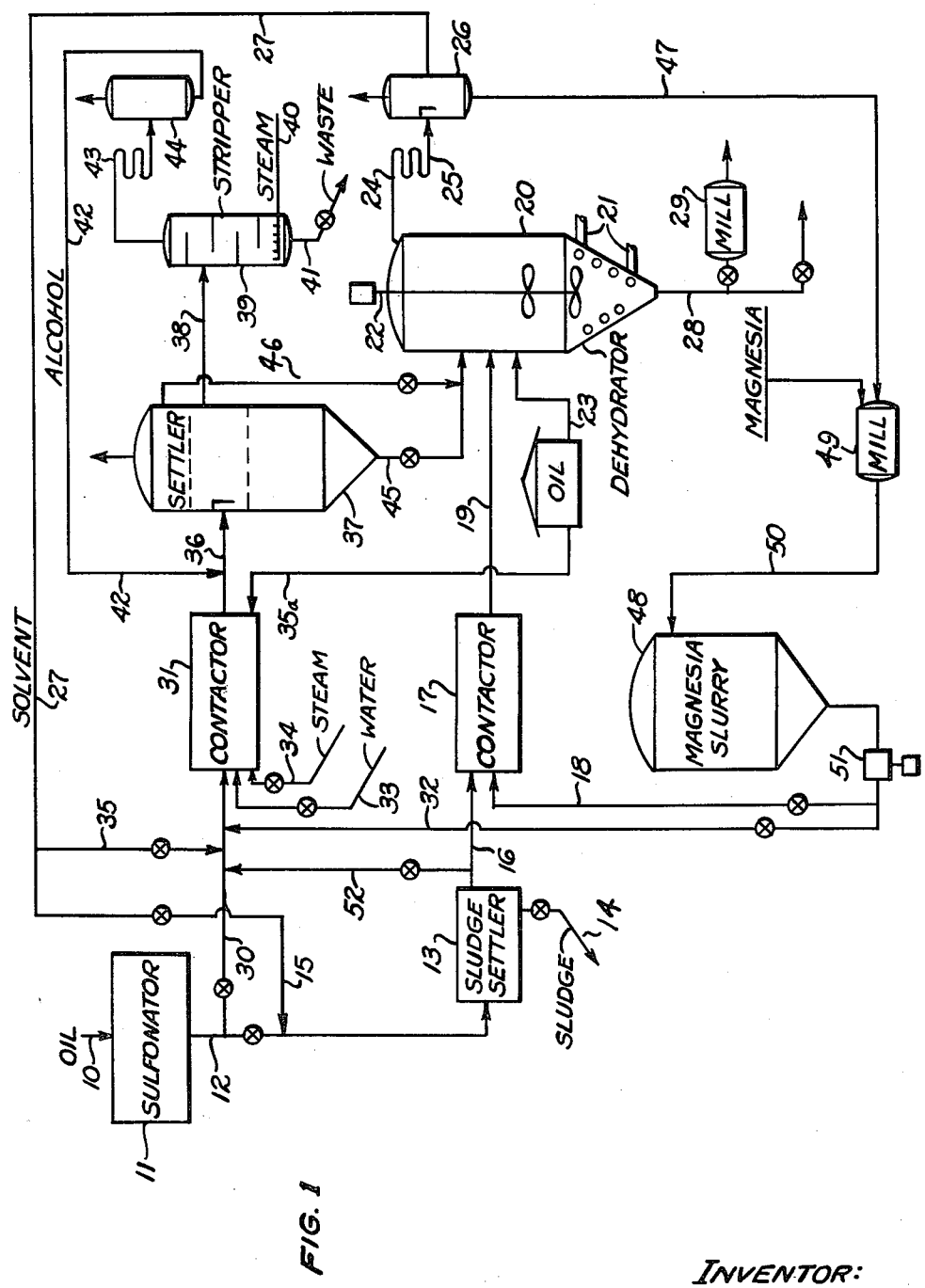
Figure 2:

The invention is illustrated by a drawing which shows in FIGURE 1 a schematic flow diagram of an apparatus for manufacturing the colloidal oil dispersions of this invention. FIGURE 2 is an electron micrograph of a dispersion of magnesium hydroxide in oil characteristic of the dispersions produced by my process.

Heretofore, it has been observed that various residual fuel oils containing small amounts of organic vanadium of the order of one to ten parts per million or more cause severe corrosion in boilers and turbines where these oils are burned. A great deal of research has been directed to this problem and its solution and it has been found that the corrosion is alleviated by a variety of substances added to the fuel or sprayed into the boiler during combustion. Among the most effective substances for this purpose are magnesium and aluminum oxides which are effective when present in amounts of about two to ten times the amount of vanadium present, calculated as vanadium oxide. To this end, various aluminiferous clays such as kaolin, bauxite and dolomite, a natural form of magnesium carbonate, have been blown as dusts into boilers during operation. These materials, owing partly to their rather coarse particle size, have not been very satisfactory because of the added complication inherent in using them and because of the considerable increase in the ash problem resulting from their use. In order to avoid these difficulties, it has been proposed to employ oil soluble salts of magnesium, aluminum, etc., which can be added directly to the fuel and uniformly dispersed therein and which, on burning, produce the desired oxide for controlling corrosion. Such oil soluble salts are inherently rather expensive because of the large amount of organic acid required for their manufacture.

I have now discovered that oil dispersions of oxides and hydroxides, particularly magnesium hydroxide, are even more effective in controlling corrosion providing the hydroxide particles in the dispersion are sufficiently small. An effective particle size is in the range of 0.1 to 1 micron diameter, although particles of the order of 5 to 10 microns diameter are satisfactory. Particles above 10 microns diameter have a tendency to settle out of the oil in which they are dispersed, particularly if it is an oil of low viscosity. In the case of heavy residual oils, however, such as "bunker C" fuel oil commonly used in steam boilers of stationary power plants and on ships, single particles and clusters of smaller particles up to 50 to 75 microns diameter, remain in suspension satisfactorily. The effectiveness of the oxides in controlling vanadium corrosion appears to be dependent on the surface area of the oxide or hydroxide employed, on its fusion point, as well as its chemical nature. Accordingly, dispersions of coarser particles above 10 microns have a relatively low effectiveness per unit weight of hydroxide employed. Coarser particles are also undesirable for many applications in which it is important to avoid abrasion and erosion such as in the operation of gas turbines. Particles coarser than 5 to 10 microns should be avoided also in diesel fuels where they tend to increase the wear on fuel injector pumps, nozzles, etc.

The manufacture of dispersions of metal oxides with particle sizes below 10 microns has heretofore been very difficult owing to the difficulty of grinding oxides to this fine state of sub-division, as well as the difficulty of preventing agglomeration. I have now discovered that oil dispersions of various oxides, hydroxides, carbonates, clays, etc., can be readily prepared from aqueous suspensions, by a process of emulsification and dehydration. Ordinarily, when aqueous suspensions are dried and then dispersed in oils, they are found to have much coarser particles owing to the agglomeration and caking occurring on drying. I have now discovered that this agglomeration can be prevented by forming an emulsion of the aqueous suspension with an oil containing a sulfonate of the preferentially oil soluble type, preferably a sulfonic acid which reacts directly with the surface of basic oxide or hydroxide particles rendering them oleophyllic and providing a high degree of stabilization. Sulfonates suitable for this purpose are the preferentially oil soluble sulfonates such as the mahogany sulfonates having the property of producing water-in-oil emulsions. They can be made by the sulfonation of lubricating oils and similar hydrocarbon materials having upwards of 15 carbon atoms in the molecule, e.g.: 20–40 carbon atoms. I may also employ sulfonated alkylated aromatic hydrocarbons, usually having 15 to 30 carbon atoms. Alkyl benzines and alkyl naphthalenes are typical examples of such substances and are obtainable as residues from the manufacture of high octane gasoline by the alkylation process, polymerization, and from other petroleum refining operations. Lubricating oils suitable for making the preferentially oil soluble sulfonic acids are commonly made from lubricating distillates by extraction with selective solvents to remove the more highly aromatic constituents. They usually have viscosities in the range of 200 to 500 seconds Saybolt at 100° F. and the sulfonation is usually carried out by intimately contacting with fuming sulfuric acid under conditions well known in the art, for which see U.S. Patents 2,453,690, 2,396,673 and 2,689,221. Sulfonation can also be effected with sulfuric anhydride or sulfonyl chloride in a manner well known to the art.

Referring to the drawing, FIGURE 1, a suitable hydrocarbon oil as above described is introduced by line 10 to sulfonator 11 where it is contacted with oleum and the sulfonated oil now containing of the order of 15 to 60% of sulfonic acid flows by line 12 to sludge settler 13 where the oil separates into two, sometimes three layers, a thin sludge or acid layer on the bottom, a thick sludge layer in the middle, and an oil layer on top, the latter containing the preferentially oil soluble sulfonic acids. The sludge is withdrawn by line 14 and the separation can be accelerated by adding a hydrocarbon solvent or chlorinated hydrocarbon solvent by line 15. For this purpose, I may add an equal volume of petroleum naphtha, benzene, toluene, xylene, carbon tetrachloride or mixtures thereof. When adding an aromatic solvent, it is desirable to introduce about 2% of water into the sulfonated oil before contacting the solvent in order to avoid sulfonation of the latter.

From settler 13, the oil flows by line 16 to contactor 17 where it is violently agitated with an aqueous slurry of magnesium hydroxide and/or other colloidal solid dispersion introduced to the contactor by line 18. Magnesium hydroxide for this purpose is suitably obtained by precipitation from sea water by addition of lime or other alkali followed by settling and washing by decantation or otherwise. The magnesia dispersion may have a concentration of about 30%, in which case it is a soft paste. For convenience in handling and mixing, however, it is desirable to employ a magnesia concentration in the range of about 20 to 25% $Mg(OH)_2$. When the magnesia is intimately mixed with the sulfonic acid-oil solution, an emulsion is formed which quickly reverses from the oil-in-water type to the water-in-oil type. In so doing, it passes through a stage in which a thick mush is obtained which quickly becomes a fluid slurry as the water-in-oil type emulsion stage is reached. Contactor 17 may be a centrifugal pump provided with a recirculating line from the discharge to the suction. Various commercial contactors providing high velocity contact between the oil and water phases can be used. I may also use a colloid mill to insure thorough contacting and disintegration of the agglomerates, such as the well known Morehouse mill.

The ratio of magnesia to sulfonic acid charged to contactor 17 may vary considerably, depending on the character of the final product desired. Thus, if it is desired to make a product having a high degree of surface activity or "detergency," I may employ one volume of sulfonated oil to one volume of 25% magnesium hydroxide slurry. The usual ratio, however, of magnesia slurry to sulfonated oil is about 2 to 4 volumes of magnesia slurry to 1 volume of sulfonated oil containing 50% of hydrocarbon solvent. An amount of magnesia from 5 to 50 times, usually about 20 times, that required to neutralize the sulfonic acid, is desirable.

From contactor 17, the emulsified magnesia flows by line 19 to dehydrator 20 wherein water and solvent are removed by distillation, heat being supplied by steam coil 21, or by other suitable means. A horizontal, fired shell still may also be used for dehydration providing adequate agitation is incorporated to maintain the emulsion in rapid motion in contact with the hot surfaces. Dehydrator 20 is provided with agitator 22, illustrated as a rotating paddle type. There is also introduced into the dehydrator by line 23 a suitable oil for controlling the concentration of magnesia in the final product and for controlling viscosity. A light petroleum lubricating distillate may be used such as pale oil of 60 to 100 seconds Saybolt at 100° F., neutral oil, diesel fuel distillate, kerosene, gas oil, and the like. Where it is not important to produce a freely flowing product, I may use heavier oils such as the residual fuels, particularly No. 3 and No. 5 S.A.E. The diluent oil in line 23 may be introduced optionally into contactor 17 if desired. In dehydrator 20, the temperature is raised, either batchwise or continuously, to about 250 to 350° F. to drive off most of the water and volatile solvent which are conducted in the form of vapors by line 24 leading to condenser 25 and receiver 26 where the hydrocarbon solvent separates as an upper layer on the water and is recycled by line 27 back to the sulfonated oil in line 12. The dehydrated magnesia-oil dispersion from 20 is drawn off by line 28 as a finished product. It is an opalescent oil, translucent in thin layers and, for most purposes, it will contain from 25 to 35% of magnesium hydroxide and about 1 to 10% of magnesium sulfonate in oil. It is sometimes desirable to pass the final product through a colloid mill or other disintegrating device to reduce any agglomerations and particles of foreign matter which may have accumulated in the operation. For this purpose, I may conduct the product, either after cooling or while hot, through colloid mill 29. In some cases, the dispersion may have a tendency to thicken or gel on standing. If gelling occurs, simply heating the oil will liquefy it again, and I have also found that gelling can usually be prevented by adding a small amount of an anti-gelling agent such as butyl cellosolve or hexylene glycol in an amount of about 0.1 to 1%, usually about 0.2%.

FIGURE 2 shows the character of the solid particles obtained from a magnesium hydroxide oil dispersion produced by my process in which the dispersion contained about 31% of magnesium hydroxide. The photograph was made by diluting the product with 9 volumes of toluene, pouring the dilution on a microscope slide and drying the specimen. Enlargement was made with the electron microscope and represents a magnification of 16,000×. It will be seen that the diameter of the ultimate particles is approximately 0.1 micron and that they are generally in small clusters, the larger clusters having a diameter of about one to two microns. Burning tests on fuel oils to which this material has been added indicate that it is highly effective in combating vanadium corrosion, even more effective than when the magnesium is employed in the form of an oil soluble salt. This indicates that the clusters of the ultimate particles may be disintegrated or exploded in the furnace as a result of rapid vaporization of oil and water of hydration contained in them. It also indicates that there is a definite advantage to the use of colloidal solid particles which present an extensive surface to combustion gases, the solid particles serving to absorb the radiation energy of the combustion mixture, becoming intensely heated thereby. The extensive surface presented by the solid particles of magnesia may also serve to absorb harmful vanadic acid more rapidly than magnesia which is in the combined state.

ALTERNATIVE OPERATION

As an alternative to the foregoing method of operation, I may omit the separation of sludge from the sulfonated oil and conduct the entire sulfonation product by line 30 leading to contactor 31 where the oil is intimately mixed with magnesia slurry and/or other dispersed solid introduced by line 32. The sulfonic acid, together with excess sulfuric acid and sludge acids in this case, are completely and instantly neutralized by the basic oxide in contactor 31 with the formation of a water-in-oil type emulsion, as previously described in connection with contactor 17. Additional water and steam can be added by lines 33 and 34 to produce a mixture containing about one to three volumes of water to each volume of sulfonated oil. Here again the ratio of magnesium hydroxide to sulfonated oil may vary over a considerable range of from about 2 volumes of magnesium hydroxide slurry of 20 to 30% concentration per volume of oil to 5 or 10 volumes of magnesia slurry per volume of sulfonated oil. In order to facilitate the contacting operation in 31, I may also introduce from 1 to 2 volumes of light hydrocarbon solvent by line 35.

It is also usually desirable to add diluent oil at this point by line 35a, the amount added usually being one to five times the volume of the sulfonated oil charged by line 30. Oil for this purpose is suitably a petroleum distillate oil of the character previously described in connection with the oil in line 23. The hot, emulsified water-oil-magnesia mixture from contactor 31 is passed by line 36 to settler 37 where it separates into a heavy emulsified magnesia layer in the bottom and a water layer on top. The water layer will contain in solution most of the magnesium sulfate produced by neutralization of excess sulfuric acid present in the sulfonated oil. The water is drawn off by line 38 to stripper 39, heated by steam from line 40. The stripped water solution of magnesium sulfate is conducted by line 41 to waste or to a magnesium sulfate recovery plant if desired.

It is usually desirable, in order to speed up the separation of water and magnesia emulsion in settler 37, to add by line 42 an emulsion breaking solvent which is usually an alcohol or other oxygenated organic solvent which is at least partially water soluble. For this purpose, isopropyl alcohol is conveniently employed and I may also use butyl alcohol, dioxane, acetone, etc. When employing propyl alcohol, it is mostly recovered from the water layer in stripper 39 and the vapors are condensed in condenser 43 leading to receiver 44 from which the alcohol is recycled by line 42 as hereinabove described.

The emulsified magnesia-oil mixture from settler 37 is conducted by line 45 to dehydrator 20 wherein it is dehydrated as previously described. Any oil layer collecting on top of the water layer in 37 can be withdrawn from time to time by line 46 leading also to dehydrator 20. When operating in this alternative manner without the separation of sludge and without the use of hydrocarbon solvent, I may increase the ratio of alcohol or other oxygen-containing solvent to sulfonated oil, for example, to one-half volume or one volume per volume of sulfonated oil and recycle the alcohol in the system by line 27 and line 35, as well as by line 42.

The water condensed in the bottom of receiver 26 is conducted by line 47 back to the magnesia slurry tank 48, where it is used to dilute the magnesium hydroxide paste as desired. Any solvent or alcohol contained in the water is thus restored to the system and not lost. Where the particle size of the magnesia charged to the process is sufficiently fine, the water and magnesia may be mixed in a simple mixer 49, which may be a centrifugal pump. In some cases, however, the magnesium hydroxide may be available only in the form of agglomerated magnesium hydroxide in which the individual particles, although of sub-micron size, are agglomerated in large aggregates of 50 to 200 microns diameter. This form of magnesium hydroxide is frequently obtained when more concentrated solutions of sea water brines or other brines are precipitated with lime. In this case, it has been found desirable to initially mill the magnesia with water in a colloid mill, for example, a Morehouse mill, in which the mixture of magnesium hydroxide and water is forced to pass between surfaces of two hard surfaced wheels, for example, Carborundum, running at high relative velocity and narrow clearance. The resulting slurry or paste of magnesium hydroxide is led by line 50 from mill 49 to magnesia slurry tank 48 from which it is withdrawn by pump 51 to contactors 17 and 31 as desired. It is sometimes desirable to settle the sludge from the sulfonated oil in settler 13 and conduct the preferentially oil soluble sulfonic acids by line 52 to contactor 31 as described hereinabove, thereby reducing the amount of magnesia which would otherwise be required to neutralize the acids contained in the sludge eliminated by line 14, thereby providing a third alternative method of operating the process. I can also employ mixtures of magnesia with sufficient lime or barium hydroxide to neutralize the free acids present, particularly the sulfuric and sulfurous acids. In this case, the sulfonation mixture from 11 is directly neutralized with a water slurry of magnesia-lime or magnesia-baryta, with or without a hydrocarbon or other diluent to aid contacting.

The following examples illustrate the process and product of this invention:

*Example 1*

Into 560 grams of magnesium hydroxide paste containing 30% $Mg(OH)_2$ was thoroughly mixed one liter of "acid oil" obtained from the sulfonation of lubricating oil with oleum followed by dilution with an equal volume of aromatic naphtha and settling to remove sludge. To the mixture was added 50 cc. of isopropyl alcohol to hasten the contact. The mixture was dehydrated by heating to 250° F. and gave an opaque translucent dispersion which solidified to a gel on cooling. Analysis by ashing showed 21.9% MgO. The dispersion was heated with 1% of ethylene glycol after which no further gelling occurred.

*Example 2*

To 840 grams of magnesium hydroxide paste (30%) was added one liter of acid oil, as in Example 1, and the mixture was dehydrated at 250° F. Five grams of ethylene glycol was added as an anti-gelling agent and the product was cooled, forming a viscous liquid opalescent dispersion. The yield was 717 grams. A portion of this product was diluted with several volumes of a light petroleum naphtha and allowed to settle for two days. A small amount of magnesium hydroxide representing coarser agglomerates was observed to have collected at the bottom of the mixture and was separated therefrom. On evaporation of the naphtha, there was obtained a milky oil which analyzed 20.5% magnesium oxide by ashing.

*Example 3*

To 125 grams of magnesium hydroxide paste containing 33% $Mg(OH)_2$ was added 175 grams of bentonite clay. Sufficient water was added to make 1460 grams of a thick slurry, to which was added 1700 cc. of acid oil as described in Example 1 (acid value 25.5). The light brown emulsion was evaporated with stirring to 330° F., giving a yield of 956 grams of oil dispersion containing 25.8% ash. A microscopic examination showed most of the particles to fall within the range of 1 to 2 microns diameter with many particles of 5 to 30 microns diameter.

*Example 4*

A zinc oxide paint pigment having a particle size of about one-fourth micron was made into a thin paste with water, 250 grams of oxide being made up to 600 cc. To this paste was added with agitation, 300 grams of acid oil, as described in Example 1. The acid oil was rapidly neutralized giving a creamy emulsion with evolution of heat. To this emulsion was added 300 grams of a neutral oil—480 seconds viscosity Saybolt at 100° F. The mixture was dehydrated to 325° F. by adding xylene to assist in driving off the water which stubbornly remained in the emulsion of the water-in-oil type. The product was a thin dispersion having an ash value of 28.8% and particle size of about 1 micron as examined under the microscope.

*Example 5*

To 200 grams of magnesium hydroxide paste containing 30% $Mg(OH)_2$ was added 200 cc. of water, then mixed to produce a creamy slurry. To this slurry was added 250 grams of sulfonated oil containing approximately 60% sulfonic acid (200 acid value) diluted with 500 cc. of petroleum xylene. To the mixture was then added 400 grams of aluminum oxide in the form of a slurry prepared by passing the aluminum oxide powder and water through a Morehouse mill. Neutralization of the sulfonic acid was instantaneous. To the mixture was then added 400 grams of 150 neutral oil. The emulsion was dehydrated to a temperature of 300° F., yielding a white fluid dispersion having an ash value of 39.2%. Dehydration in the range of 200 to 220° F. was facilitated by adding additional xylene solvent to drive out the water from the water-in-oil emulsion.

*Example 6*

Silica in the form of diatomaceous earth was mixed with two to three volumes of water and passed through a Morehouse mill, forming a thin milky dispersion which had a tendency to settle rapidly to a hard cake. Examination of the upper layers of the cake showed it had a particle size of less than 1 micron. To the silica slurry was added 200 grams of magnesium hydroxide paste and the mass was thoroughly mixed. Then 250 grams of sulfonated oil, as described in Example 5, was added with agitation. To the mixture was then added 400 grams of 150 neutral oil and the mixture was then dehydrated to 300° F. A heavy slime developed at 220° F. when most of the water had been eliminated. 100 grams more of neutral oil was added to reduce the viscosity at this temperature. The product was a fluid viscous dispersion having an ash content of 35.8%.

*Example 7*

A washed magnesium hydroxide slurry obtained from precipitation of sea water brine was mixed with water and passed through a Morehouse mill to reduce the agglomeration of the particles, thereby converting the fluid slurry to a smooth paste. To 8.8 kg. of the paste containing 28% $Mg(OH)_2$ was added with agitation, 10 liters of acid oil as in Example 1 (acid value 19), and 1 liter of light, distillate lubricating oil (60 pale oil). During the mixing, the smooth creamy mixture became a mush, then inverted to a fluid water-in-oil type emulsion, heat of neutralization warming the mass to about 150° F. The slurry was dehydrated to a temperature of 300° F. by heating with a steam coil. The product was a smooth viscous opaque oil which, after standing and cooling for 24 hours, could be poured into a container. Yield—6.6 kgs.

*Example 8*

To 37.7 pounds of magnesium hydroxide paste, as described in Example 7, was added 12.9 pounds of acid oil containing 50% aromatic naphtha diluent, as in Example 1. Then 200 cc. of isopropyl alcohol was added to facilitate the neutralization and mixing. To the mixture was then added 7.5 pounds of 60 pale oil. After dehydrating the mixture by boiling with a steam coil, driving off the water and solvent up to 300° F., there was obtained a yield of 25 pounds of opalescent oil having an ash of 31.3% (MgO).

The products from Examples 7 and 8 were combined and passed through a Morehouse mill equipped with Carborundum stones of 100 mesh grain size, the rate of milling being about one-half gallon per minute. The final product had an ash value of 27% MgO. After 60 days' settling, analysis gave 22.5% MgO and the opalescent oil titrated 540 alkali value with methyl orange indicator.

*Example 9*

A magnesium hydroxide paste containing about 30% $Mg(OH)_2$ was mixed with acid oil, as in Example 1, using 2.8 kg. of the paste and 1 liter of water to 5 liters of acid oil. After 3 liters of the acid oil had been added, the paste became fluid as a result of the inversion of the emulsion. The mixture was partially dehydrated by heating, then passed through a Morehouse mill, and finally dehydrated to 300° F. The product analyzed 21.8% magnesium oxide by ashing.

This product was added to a residual fuel oil containing 7 parts of vanadium per million using two parts of the magnesia dispersion (MgO basis) to each part of vanadium in the oil. The treated fuel was burned in a gas turbine and the corrosion of the turbine blades was observed to be less than that found with any other substance tested for the purpose.

*Example 10*

The magnesia dispersion of Example 8 was diluted with about 2 volumes of 200° F. boiling point naphtha and allowed to settle overnight. A small amount of coarser particles, about 5% of the total magnesia content, was collected on the bottom and discarded. The opalescent dispersion in naphtha was added to motor gasoline in the ratio of about 0.5 gram, MgO basis, per gallon. The gasoline was consumed in an automobile engine in normal driving. After 1,000 miles, the engine was opened and it was found that a thin white deposit of magnesium oxide coated the surfaces of the combustion chamber and spark plugs with the exception of the electrodes which remained bare of deposit. The smooth performance of the engine indicated that the magnesium oxide served to scavenge lead from the combustion chambers, valves and spark plugs, thus preventing "hot spots" and preignition. This effect appears to be due to the formation of magnesium plumbite or basic magnesium plumbite which is discharged from the cylinders as a dust in the exhaust gas. Inasmuch as the gasoline used in the above test contained about 2–3 cc. per gallon of lead tetra-ethyl in adidtion to organic bromine and chlorine compounds, the magnesium hydroxide in colloidal form also neutralized hydrochloric and hydrobromic acids resulting from their combustion as well as sulfuric acid resulting from the combustion of organic sulfur compounds present in small amounts in all commercial gasolines, usually less than 0.1%, sulfur basis.

My fuel additive containing colloidal oxides, hydroxides and carbonates of group II metals is characterized by a high alkali value in the range of 200 to 800 mg. KOH per gram equivalent as determined by titration with standard acid using methyl orange indicator. This high alkalinity is largely represented by the free base which is colloidally dispersed in the oil rather than base which is in chemical combination with organic acids employed as peptizing agents. As a result, it is instantly available for neutralization of acids formed in the combustion reactions. When adding a magnesia dispersion to gasoline containing 1 to 3 cc. tetra-ethyl lead per gallon, I find the amount of additive required to be from 0.1 to 2 grams, MgO basis, per gallon, depending on the amount of lead, sulfur content of the gasoline, and whether halogen compounds are present. This corresponds to about 0.5 to 9 cc. per gallon of additive containing 20% MgO, having a density of 1.1 grams per cc.

The infusible character of magnesium oxide, is believed to be an important factor in determining the high effectiveness of this material for controlling combustion reactions. By "infusible" is meant that the temperatures of most combustion reactions, 1500 to 2500° C., are well below the fusion point of magnesium oxide—2800° C. Accordingly, the surface activity of the colloidal particles remains effective to absorb acids formed in the combustion and prevent their deposition on the surfaces of turbine blades, boiler tubes, refractories, spark plugs, valves and cylinder walls of internal combustion engines, etc.

The term "magnesia" is used in this application in a general sense to include the hydroxide and the carbonate, as well as the oxide, inasmuch as they instantly become the oxide at the temperature of the combustion chamber. The carbonate is easily made by contacting the aqueous slurry of the hydroxide with carbon dioxide gas, or carbon dioxide can be introduced into the dispersion of magnesium hydroxide in oil after it is formed with the sulfonate.

When employing colloidal magnesia in gasoline motor fuel, it can be used in conjunction with lead tetra-ethyl anti-knock compound without the usual bromide or chloride scavenger, thereby reducing corrosion in the engine and exahust system resulting from these halogens. The oxides of lead, owing to their acidic nature, are adsorbed on the surface of the magnesia particles and carried out of the combustion chamber with the exhaust gases as a harmless smoke.

When adding the magnesia dispersion to heavy residual fuels, it is desirable to heat the fuel oil sufficiently to reduce viscosity to a point where it can be easily mixed with the concentrated dispersion of magnesia in oil. The concentrate will usually contain about 20 to 30% MgO by weight. Accordingly, when treating a heavy fuel oil (300 lbs./bbl.) containing 5 parts vanadium per million, it is necessary to add about 1.4 grams MgO per bbl. which is 7 grams of a 20% concentrate per bbl. The density of a 22.5% MgO concentrate was 1.1, equivalent to 9.17 lbs./gal. Accordingly, 1 gallon of this concentrate is sufficient to treat 678 bbl. of fuel oil with 10 parts per million of MgO.

In forming the emulsions of dispersed solids and mineral oils in my process, I prefer to reduce the viscosity of the oil by having a volatile hydrocarbon solvent present, preferably an aromatic solvent boiling above water such as toluene and xylene or mixtures thereof as are found in the aromatic naphthas from petroleum produced by catalytic aromatization reactions. On dehydration of the emulsion, these solvents aid in expelling the water vapor. For most purposes, there is no objection to permitting some of the solvent to remain in the product.

Although I have described my process of making oil dispersions as applied chiefly to magnesia, I can employ other oxides, hydroxides and carbonates of group II metals having atomic numbers from 12 to 56 including magnesium, zinc, calcium, strontium, barium and cadmium. Of these, I prefer magnesium because of its refractory character, low atomic weight, low cost and moderate basicity. I can employ combinations of any of the above compounds and, as described heerinabove, I can add other colloidal solids in aqueous dispersions to the emulsions of group II oxides, carbonates and hydroxides, particularly colloidal aluminum oxide and aluminiferous clays, such as kaolin, bentonite and montmorillonite.

The preferred method of forming emulsions of group II hydroxides, oxides and carbonates is to contact the aqueous dispersions with sulfonic acid in oil, the acid thus coating each particle of the metal compound to render it oil "soluble" or dispersible, i.e.: oleophilic. However, I can also employ the sulfonates of these group II metals, such as magnesium, calcium and barium sulfonate, in solution in mineral oil with or without a hydrocarbon diluent, such as solvent naphtha, Stoddard solvent, toluene, xylene, kerosene, etc. I prefer to add the sulfonate solution to a body of the aqueous dispersion, forming first an oil-in-water emulsion which later reverses. As an example of this procedure, a dispersion of 25% $Mg(OH)_2$ in water having a particle diameter of 0.1 to 10 microns is vigorously agitated and to the mass is gradually added a solution of 20% calcium mahogany sulfonate in lubricating oil. When the resulting emulsion is heated, reversal takes place to form the water-in-oil type, sometimes with separation of a water phase which can be discarded. The emulsion is then dehydrated to a temperature of 250° to 350° F. to produce the product. Ammonium sulfonate can also be used as the emulsifying agent and dispersant, in which case ammonia is eliminated on heating.

It is characteristic of my fuel oil additive that the amount of solid, dispersed basic oxygen compound present is large relative to the amount of organic peptizing agent present. Thus the weight ratio of magnesia to sulfonate is usually about 1 to 3 or even 5, and with baryta it is even higher, e.g., 5 to 8. This high ratio of alkaline agent to organic acid is in striking contrast to alkaline additives used heretofore in which the alkaline component constituted only about 10% of the weight of the sulfonate or other solubilizing agent.

Having thus described my invention, what I claim is:

1. The process of making a dispersion in oil of an oxygen compound selected from the group consisting of the oxides, hydroxides and carbonates of the metals of group II of the periodic system having atomic numbers from 12 to 56 which comprises forming an aqueous dispersion of said compound in which the major part, by weight, is in the form of particles of less than 5 microns diameter, preparing an oil-in-water type emulsion by agitating said aqueous dispersion with mineral oil in the presence of a preferentially oil soluble sulfonate of said group II metal, the ratio of said oxygen compound to said sulfonate being about 5 to 50 times the stoichiometric ratio, continuing the agitation and heating the emulsion, thereby reversing said emulsion to form a water-in-oil type emulsion then dehydrating the said water-in-oil emulsion to produce the desired colloidal dispersion.

2. The process of claim 1 wherein a volatile hydrocarbon solvent is present in said emulsion with mineral oil and sulfonate and said volatile solvent is removed by evaporation during said dehydration step.

3. The process of claim 2 wherein said volatile solvent is an aromatic hydrocarbon selected from the class consisting of toluene and xylene.

4. The process of claim 1 wherein said oxygen compound is magnesium hydroxide.

5. The process of claim 1 wherein the ratio of said oxygen compound to said sulfonate is within the range of 5 to 1 and 20 to 1 based on their neutralization equivalents.

6. The process of making a dispersion of magnesium hydroxide in hydrocarbon oil wherein the particles of said hydroxide have a particle size principally in the range of 0.1 to 10 microns and are permanently dispersed in said oil by the peptizing action of magnesium sulfonate, comprising preparing an aqueous dispersion of magnesium hydroxide with particles less than 10 microns diameter, thoroughly mixing with said aqueous dispersion a hydrocarbon solution of a sulfonic acid of the preferentially oil soluble type, agitating the mixture and heating it to produce an emulsion of the water-in-oil type and thereafter removing excess water from said emulsion by evaporation, thereby leaving said magnesium hydroxide dispersed in said oil substantially without increase in particle size over that present in said aqueous dispersion, the ratio of magnesium hydroxide to sulfonic acid being about 5 to 50 times that required for neutralization.

7. The process of claim 6 wherein said aqueous dispersion contains from 20 to 30% $Mg(OH)_2$.

8. The process of claim 6 wherein said hydrocarbon solution is comprised of sulfonic acid, lubricating oil and volatile hydrocarbon diluent and said diluent is removed during said evaporation step.

9. The method of reducing corrosion of furnaces and engines resulting from vanadium contained in residual fuel oil burned therein which comprises adding to said fuel oil an oil dispersion of magnesium hydroxide wherein the particles of said magnesium hydroxide are predominantly in the range of 0.1 to 10 microns diameter and said dispersion is stabilized by a mahogany sulfonate of magnesium in an amount equal to 2 to 20% of the said magnesium hydroxide, stoichiometrically, said magnesium being present in said fuel in the ratio of 2 to 10 times the amount of vanadium present, calculated as their respective oxides, said oil dispersion having been prepared by the process of claim 10.

10. The process of making a stable dispersion of magnesium hydroxide in oil suitable for use as a corrosion preventive in fuel oils which comprises precipitating magnesium hydroxide from a magnesium containing brine, then, without drying, mixing the resulting paste with an oil solution of a preferentially oil soluble sulfonic acid in which the amount of sulfonic acid present is only 1/5 to 1/50 of that needed to combine with the magnesium hydroxide, continuing the mixing and heating until the initial creamy emulsion inverts to a water-in-oil type, removing the water from the latter to produce a substantially water free dispersion of magnesium hydroxide in oil in which the particles are predominantly in the range of 1/10 to 10 microns diameter.

References Cited in the file of this patent
UNITED STATES PATENTS

| | | |
|---|---|---|
| 2,079,051 | Sullivan et al. | May 4, 1937 |
| 2,485,861 | Campbell et al. | Oct. 25, 1949 |
| 2,501,731 | Mertes | Mar. 28, 1950 |
| 2,671,758 | Vinograd et al. | Mar. 9, 1954 |

FOREIGN PATENTS

| | | |
|---|---|---|
| 745,012 | Great Britain | Feb. 15, 1956 |